(12) United States Patent
Miyake

(10) Patent No.: US 8,994,763 B2
(45) Date of Patent: Mar. 31, 2015

(54) DISPLAY DEVICE AND DRIVING METHOD OF THE SAME

(75) Inventor: Hiroyuki Miyake, Atsugi (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 291 days.

(21) Appl. No.: 13/421,165

(22) Filed: Mar. 15, 2012

(65) Prior Publication Data

US 2012/0242723 A1  Sep. 27, 2012

(30) Foreign Application Priority Data

Mar. 25, 2011  (JP) ................. 2011-067417

(51) Int. Cl.
- G09G 5/02 (2006.01)
- G09G 3/32 (2006.01)
- G09G 5/10 (2006.01)
- G02F 1/13 (2006.01)
- G09G 3/00 (2006.01)
- H04N 13/04 (2006.01)

(52) U.S. Cl.
CPC .. G09G 3/32 (2013.01); G09G 5/02 (2013.01); G09G 5/10 (2013.01); G02F 1/13 (2013.01); G09G 3/003 (2013.01); H04N 13/0413 (2013.01); H04N 13/0479 (2013.01); G09G 3/3225 (2013.01); G09G 2300/023 (2013.01); H04N 2213/001 (2013.01); G09G 2300/0452 (2013.01); G09G 2300/0804 (2013.01); G09G 2300/0861 (2013.01)
USPC ........... 345/694; 345/695; 345/696; 345/697; 345/698; 345/699; 345/76

(58) Field of Classification Search
None
See application file for complete search history.

(56) References Cited

U.S. PATENT DOCUMENTS

| | | | |
|---|---|---|---|
| 4,022,993 A | 5/1977 | Shattuck | |
| 5,515,045 A | 5/1996 | Tak | |
| 5,616,936 A | 4/1997 | Misawa et al. | |
| 5,867,149 A | 2/1999 | Jaeger | |
| 6,040,810 A | 3/2000 | Nishimura | |

(Continued)

FOREIGN PATENT DOCUMENTS

| | | |
|---|---|---|
| EP | 1 126 709 A | 8/2001 |
| JP | 08-036145 A | 2/1996 |

(Continued)

Primary Examiner — Joseph Haley
Assistant Examiner — Ifedayo Iluyomade
(74) Attorney, Agent, or Firm — Eric J. Robinson; Robinson Intellectual Property Law Office, P.C.

(57) ABSTRACT

In a display device in which a shape of a parallax barrier is changed depending on the relative positional relation to the viewer, the occurrence of crosstalk is suppressed. Images are displayed in a part of a plurality of sub-pixels included in each pixel, and images are not displayed in the other sub-pixels. That is, a display area in the pixel is reduced. Thus, the occurrence of crosstalk can be suppressed. Further, sub-pixels have a square shape or a substantially square shape. Thus, even when sub-pixels which display images are selected depending on the relative positional relation to the viewer, the shape of the display area in the pixel does not change greatly. Therefore, even in the case where the positional relationship is changed (in the case where the arranged parallax barrier is changed), the occurrence of crosstalk can be suppressed without respect to the positional relationship.

16 Claims, 9 Drawing Sheets

(56) References Cited

U.S. PATENT DOCUMENTS

| | | |
|---|---|---|
| 6,232,937 B1 | 5/2001 | Jacobsen et al. |
| 6,246,388 B1 | 6/2001 | Motegi et al. |
| 6,597,348 B1 | 7/2003 | Yamazaki et al. |
| 6,774,872 B1 | 8/2004 | Kawada et al. |
| 6,784,874 B1 | 8/2004 | Shimizu |
| 6,882,012 B2 | 4/2005 | Yamazaki et al. |
| 7,113,154 B1 | 9/2006 | Inukai |
| 7,145,536 B1 | 12/2006 | Yamazaki et al. |
| 7,148,911 B1 | 12/2006 | Mitsui et al. |
| 7,193,593 B2 | 3/2007 | Koyama et al. |
| 7,194,085 B2 | 3/2007 | Yamazaki et al. |
| 7,224,339 B2 | 5/2007 | Koyama et al. |
| 7,268,756 B2 | 9/2007 | Koyama et al. |
| 7,317,438 B2 | 1/2008 | Yamazaki et al. |
| 7,385,579 B2 | 6/2008 | Satake |
| 7,425,937 B2 | 9/2008 | Inukai |
| 7,489,777 B2 | 2/2009 | Yamazaki et al. |
| 7,791,571 B2 | 9/2010 | Ohtani et al. |
| 2005/0012097 A1 | 1/2005 | Yamazaki |
| 2005/0030267 A1* | 2/2005 | Tanghe et al. .................. 345/82 |
| 2007/0279359 A1 | 12/2007 | Yoshida et al. |
| 2007/0279374 A1 | 12/2007 | Kimura et al. |
| 2009/0270134 A1 | 10/2009 | Yamazaki et al. |
| 2009/0321737 A1 | 12/2009 | Isa et al. |
| 2010/0148177 A1 | 6/2010 | Koyama et al. |
| 2010/0182282 A1 | 7/2010 | Kurokawa et al. |
| 2011/0157916 A1* | 6/2011 | Lee et al. ..................... 362/613 |
| 2011/0242100 A1 | 10/2011 | Yamazaki et al. |
| 2012/0044255 A1* | 2/2012 | Singh et al. .................. 345/594 |
| 2012/0206503 A1 | 8/2012 | Hirakata et al. |

FOREIGN PATENT DOCUMENTS

| | | |
|---|---|---|
| JP | 2003-259395 A | 9/2003 |
| JP | 2005-258013 | 9/2005 |
| WO | WO 94/19736 | 9/1994 |

\* cited by examiner

| | 3D display (row direction) | 3D display (column direction) | 2D display |
|---|---|---|---|
| 119 | L | H | L |
| 120 | H | L | L |
| 121 | H | H | L |

DISPLAY DEVICE AND DRIVING METHOD OF THE SAME

BACKGROUND OF THE INVENTION

1. Field of the Invention

The present invention relates to a display device. In particular, the present invention relates to display devices capable of displaying three-dimensional (3D) images.

2. Description of the Related Art

Display devices are widely used, ranging from large display devices such as television devices to small display devices such as mobile phones. From now on, products with higher added values will be needed and are being developed. In recent years, display devices that can display 3D images have been developed in order to display more realistic images.

As methods for displaying 3D images, there are a method using glasses for separating an image seen with a left eye and an image seen with a right eye (also referred to as stereoscopy), and autostreoscopy by which 3D images can be seen by the naked eye by addition of a structure for separating an image seen with a left eye and an image seen with a right eye in a display portion. It is not necessary to prepare glasses to see autostreoscopic 3D images, which offers a high convenience. Autostereoscopic 3D display is coming into widespread use such as mobile phones and mobile game consoles.

As a method for displaying autostreoscopic 3D images, there is known a parallax barrier method in which a parallax bather is added to a display portion. A parallax barrier for the parallax barrier method is a stripe-shaped light-shielding portion and causes a decrease in resolution when display is switched from 3D display to 2D display. In view of this, for the parallax barrier method, there is suggested a structure in which a liquid crystal panel having a patterned transparent electrode is used for switching between 2D display and 3D display (see Patent Document 1). In that case, transmission or shielding of light by a liquid crystal layer can be controlled by controlling voltage applied to the transparent electrode in order to set the presence or absence of a parallax barrier.

Moreover, there are mobile phones and the like in which a direction in which a parallax barrier is arranged is changed when an orientation of a display portion with respect to a viewer is changed.

REFERENCE

[Patent Document 1] Japanese Published Patent Application No. 2005-258013

SUMMARY OF THE INVENTION

The above parallax barrier is provided to make the left eye of the viewer see a part of a plurality of pixels in a display portion, and to make the right eye of the viewer see the other part of the plurality of pixels. For example, in a substrate in which the parallax barrier is arranged (hereinafter, also referred to as a shutter panel), display is blocked by stripe-shaped optical shutters arranged in a perpendicular direction or a substantially perpendicular direction to a straight line connecting the left eye and the right eye of the viewer. Thus, display of a plurality of pixels can be seen selectively by the left eye or the right eye of the viewer.

However, in 3D display by the parallax barrier method, crosstalk occurs in some cases when the relative positional relationship between the viewer and the display device is not desirable. Crosstalk refers to a phenomenon in which part of display of a pixel for a right (left) eye is seen by a left (right) eye.

In view of this, an object of one embodiment of the present invention is to suppress the occurrence of crosstalk in a display device in which the shape of a parallax barrier is changed depending on the relative positional relation to a viewer.

In a display device in one embodiment of the present invention, a pixel which is a display element unit includes a plurality of sub-pixels having a square shape or a substantially square shape. Display is performed in some of the plurality of sub-pixels, and display is not performed (black display is performed) in the other sub-pixels. In that case, display is performed in the sub-pixels arranged linearly along the long axis direction of a stripe-shaped parallax barrier.

Specifically, one embodiment of the present invention is a display device including a display panel including a plurality of pixels arranged in matrix, a shutter panel including a plurality of optical shutters arranged in matrix, and a control portion controlling display using the plurality of pixels in the display panel and an arrangement of a parallax barrier including the plurality of optical shutters in the shutter panel. The pixel includes a first sub-pixel, at least one second sub-pixel arranged in a first direction with respect to the first sub-pixel, and at least one third sub-pixel arranged in a second direction perpendicular to or substantially perpendicular to the first direction with respect to the first sub-pixel, the first to third sub-pixels having a square shape or a substantially square shape. The display device has a first display state in which the control portion displays an image using the first sub-pixel and the second sub-pixel and displays a black image using the third sub-pixel, and arranges a parallax barrier by bringing a part of the plurality of optical shutters included in the shutter panel into a light-shielding state and bringing the other part of the plurality of optical shutters into a light-transmitting state in each of the plurality of pixels included in the display panel, and has a second display state in which the control portion displays an image using the first sub-pixel and the third sub-pixel and displays a black image using the second sub-pixel, and arranges a parallax barrier by bringing a part of the plurality of optical shutters included in the shutter panel, which is different from the part of the plurality of optical shutters brought into a light-shielding state in the first display state into a light-shielding state and bringing the other part of the plurality of optical shutters into a light-transmitting state in each of the plurality of pixels included in the display panel.

Further, another embodiment of the present invention is a display device including a display panel including a plurality of pixels arranged in matrix, a shutter panel including a plurality of optical shutters arranged in matrix, and a control portion controlling display using the plurality of pixels in the display panel and an arrangement of a parallax barrier including the plurality of optical shutters in the shutter panel. The pixel includes A×B sub-pixels arranged in A rows and B columns (A and B are natural numbers of 2 or more) each having a square shape or a substantially square shape. The display device has a first display state in which the control portion displays an image using B sub-pixels arranged in one specific row and displays a black image using (A−1)×B sub-pixels arranged in (A−1) rows other than the one specific row, and arranges a parallax barrier by bringing a part of the plurality of optical shutters included in the shutter panel into a light-shielding state and bringing the other part of the plurality of optical shutters into a light-transmitting state in each of the plurality of pixels included in the display panel, and has a second display state in which the control portion displays an image using A sub-pixels arranged in one specific column, and displays a black image using A×(B−1) sub-pixels arranged in (B−1) columns other than the one specific column, and arranges a parallax barrier by bringing a part of the plurality of optical shutters included in the shutter panel into a light-shielding state which is different from the part of the plurality of optical shutters brought into a light-shielding state in the first display state and bringing the other part of the plurality of optical shutters into a light-transmitting state.

In a display device in one embodiment of the present invention, images are displayed in a part of a plurality of sub-pixels included in each pixel, and images are not displayed in the other sub-pixels. That is, a display area in the pixel is reduced. Thus, occurrence of crosstalk can be suppressed.

Further, in a display device in one embodiment of the present invention, sub-pixels have a square shape or a substantially square shape. Thus, even when sub-pixels which display images are selected depending on the relative positional relation to the viewer, the shape of the display area in the pixel (the plurality of sub-pixels performing display) does not change greatly. Therefore, even in the case where the shape of the positional relationship is changed (in the case where the arranged parallax barrier is changed), the occurrence of crosstalk can be suppressed regardless of the positional relationship.

DETAILED DESCRIPTION OF THE INVENTION

Hereinafter, embodiments of the present invention are described in detail with reference to the accompanying drawings. Note that the present invention is not limited to the description below, and it is easily understood by those skilled in the art that a variety of changes and modifications can be made without departing from the spirit and scope of the present invention. Therefore, the present invention should not be limited to the descriptions of the embodiments below.

A display device according to one embodiment of the present invention is described with reference to FIG. 1, FIG. 2, FIGS. 3A and 3B, FIGS. 4A and 4B, FIGS. 5A to 5F, FIGS. 6A and 6B, FIGS. 7A and 7B, and FIGS. 8A and 8B.

<Structural Example of Display Device>

Figure 1:
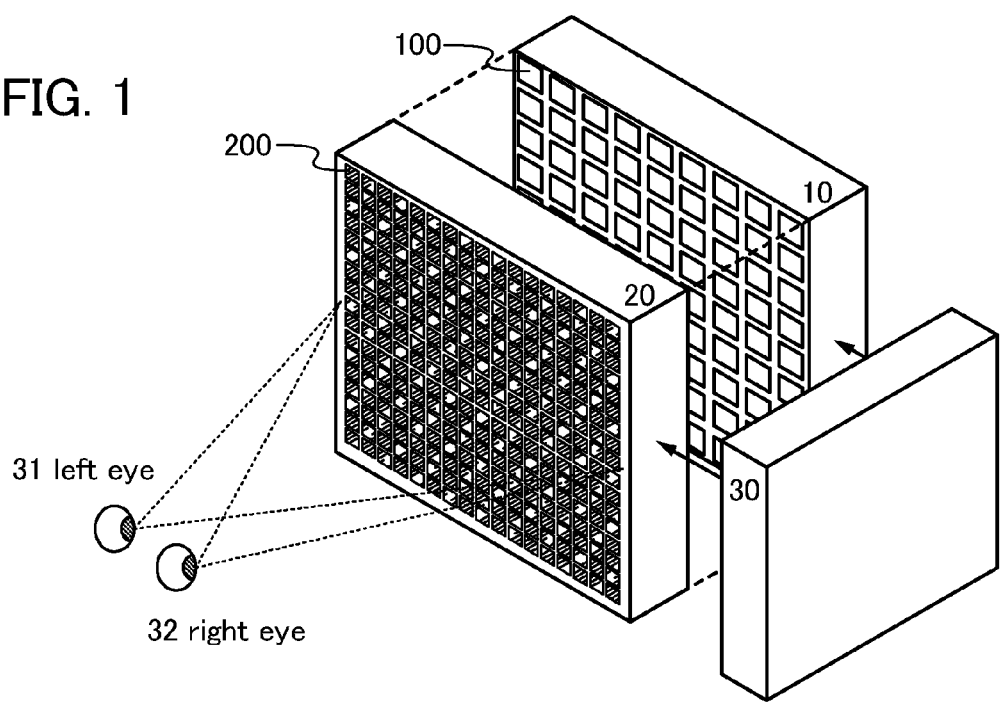
FIG. 1 is a diagram illustrating a structural example of a display device.

FIG. 1 is a diagram illustrating a structural example of a display device according to one embodiment of the present invention. FIG. 1 shows a left eye 31 and a right eye 32 of a viewer in order to show a state of the viewer's perception. The display device illustrated in FIG. 1 includes a display panel 10 in which a plurality of pixels 100 is arranged in matrix, a shutter panel 20 in which a plurality of optical shutters 200 is arranged in matrix, and a control portion 30 which controls display of a still image or a moving image in the display panel 10 and an arrangement of a parallax barrier in the shutter panel 20. The density of the plurality of optical shutters 200 is higher than that of the plurality of pixels 100. In other words, the number of the optical shutters 200 included in the shutter panel 20 is larger than that of the pixels 100 included in the display panel 10.

In the display panel 10, each pixel 100 displays a desired color, so that the plurality of pixels 100 arranged in matrix can display a specific image as a whole. Further, by switching the image sequentially, the display panel 10 can display a moving image. For example, as the display panel 10, a panel which displays images by control of the polarization state of light with liquid crystals (what is called, a liquid crystal display device), a panel which displays images by utilizing organic electroluminescence (hereinafter, also referred to as organic EL), or the like can be used.

The shutter panel 20 is provided in the direction of light emission from the display panel 10, that is, on the side viewed by the viewer of the display device. In the shutter panel 20, the state of each of the plurality of optical shutters 200 is a light-transmitting state or a light-shielding state. In the shutter panel 20, the plurality of optical shutters 200 is selectively brought into a light-shielding state, whereby a parallax barrier can be arranged. For example, as the shutter panel 20, a panel which selects a light-transmitting state or a light-shielding state of optical shutters by control of the polarization state of light with liquid crystals (a panel in which a components such as a back light and a color filter are removed from a general liquid crystal display device) or the like can be used.

The control portion 30 supplies a signal or the like for displaying a desirable still image or a desirable moving image to the display panel 10. In addition, the control portion 30 has a function of selecting whether 2D display or 3D display is performed in the display device. In the case where 3D display is performed, the control portion 30 not only supplies a signal or the like to the display panel 10, but also a signal or the like for arrangement of a parallax barrier to the shutter panel 20. Moreover, the control portion 30 has a function of detecting a change in an orientation of a display device with respect to the viewer, and changing signals which are supplied to the display panel 10 and the shutter panel 20 according to the detected direction. Specifically, display in the display panel 10 is changed 90°, and a long axis direction of a parallax barrier in the shutter panel 20 is changed 90° with each 90° change in the detected direction. For example, a following structure may be employed: the control portion 30 is provided with a sensor such as an acceleration sensor, a gravity sensor, or an angular sensor (e.g., a gyro censor), and controls signals outputted to the display panel 10 and the shutter panel 20 depending on information detected by the sensor. Moreover, the control function may include an image recognition function, so that signals outputted to the display panel 10 and the shutter panel 20 are controlled depending on information such as the orientation of the face of the viewer detected by the function.

<Structural Example of Display Panel 10>

A structural example of the display panel 10 is described with reference to FIG. 2. Note that FIG. 2 is a cross-sectional view illustrating three sub-pixels 240a, 240b, and 240c each including a light-emitting element emitting white light by using organic electroluminescence and a color filter that transmits light in a specific wavelength range included in the white light emitted from the light-emitting element to change the white light into light with a chromatic color.

Figure 2:
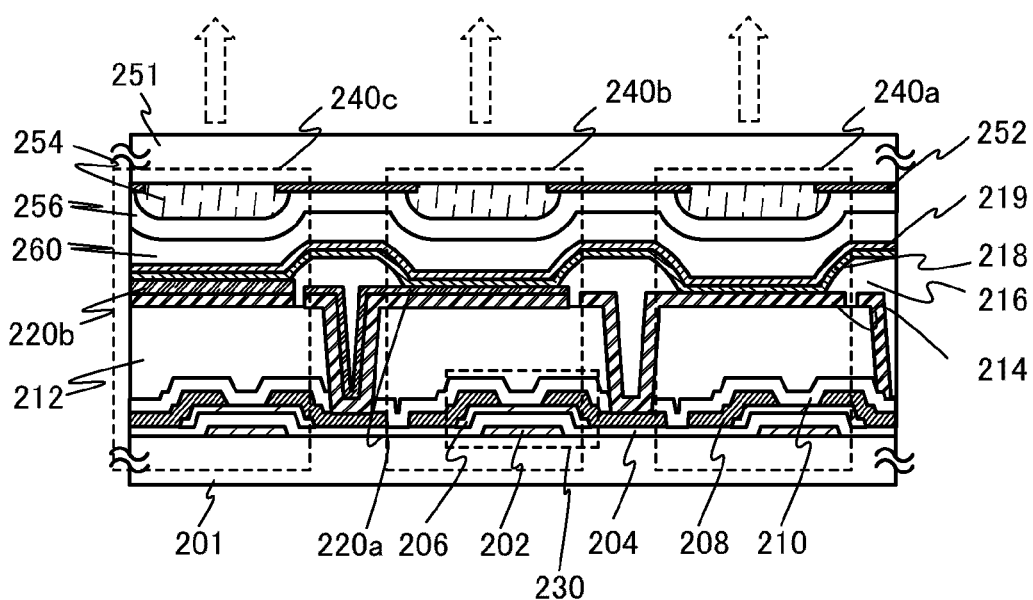
FIG. 2 is a cross-sectional view illustrating a structural example of a display panel.

The display panel illustrated in FIG. 2 emits light (displays an image) in a direction indicated by arrows in FIG. 2. That is, the display panel has a so-called top-emission structure in which light is emitted not through a first substrate 201 provided with a light-emitting layer 218 but through a second substrate 251. Note that the light-emitting layer 218 emits white light by organic electroluminescence.

As illustrated in FIG. 2, the sub-pixel 240a which is selected to emit or not emit blue light, the sub-pixel 240b which is selected to emit or not emit green light, and the sub-pixel 240c which is selected to emit or not emit red light, are formed between the first substrate 201 and the second substrate 251. Further, a transistor 230 for controlling drive of the light-emitting element and a reflective electrode layer 214 that is electrically connected to the transistor 230 are provided over the first substrate 201.

Note that the sub-pixel 240a includes a light-emitting element that has emission intensity in a blue region, the sub-pixel 240b includes a light-emitting element that has emission intensity in a green region, and the sub-pixel 240c includes a light-emitting element that has emission intensity in a red region. These light-emitting elements function as micro-cavities to intensify desired emission spectra.

In the sub-pixel 240a, the light-emitting layer 218 is directly formed on the reflective electrode layer 214 as the light-emitting element that has emission intensity in the blue region, and the transflective electrode layer 219 is formed over the light-emitting layer 218.

In the sub-pixel 240b, a first transparent electrode layer 220a is formed over the reflective electrode layer 214 as the light-emitting element that has emission intensity in the green region, the light-emitting layer 218 is formed over the first transparent electrode layer 220a, and the transflective electrode layer 219 is formed over the light-emitting layer 218.

In the sub-pixel 240c, a second transparent electrode layer 220b is formed over the reflective electrode layer 214 as the light-emitting element that has emission intensity in the red region, the light-emitting layer 218 is formed over the second transparent electrode layer 220b, and the transflective electrode layer 219 is formed over the light-emitting layer 218.

In this manner, the light-emitting elements of the sub-pixels (the sub-pixels 240a, 240b, and 240c) are different in structure between the reflective electrode layer 214 and the transflective electrode layer 219.

The second substrate 251 is provided with the light-shielding film 252 which functions as a black matrix, a color filter 254, and an overcoat 256 over the second substrate 251. The color filter 254 is a colored layer, which transmits light of a color (blue, green, or red) emitted from a corresponding light-emitting element and absorbs the other light. That is, a part of light emitted from the light-emitting layer 218 is emitted through the color filter 254 and a second substrate 251, and the other light is absorbed in the color filter 254.

In this manner, it can be said that the light-emitting elements of each of the sub-pixels (the sub-pixels 240a, 240b, and 240c) are different in optical distance between the reflective electrode layer 214 and the transflective electrode layer 219. This optical distance may be optical distance with which a spectrum needed for the light-emitting element of each pixel is amplified by a resonance effect. Only in the light-emitting element that has emission intensity in the blue region provided in the sub-pixel 240a, the light-emitting layer 218 is directly formed on the reflective electrode layer 214 and the transflective electrode layer 219 is formed over the light-emitting layer 218. In other words, transparent electrode layers (the first transparent electrode layer 220a and the second transparent electrode layer 220b) are not formed.

With such a structure, a transparent electrode layer to be formed in the sub-pixel 240a is not needed; thus, the number of steps and cost can be reduced.

Note that there is no particular limitation on a space 260 between the first substrate 201 and the second substrate 251 as long as the space 260 transmits light. It is preferable that the space 260 be filled with a light-transmitting material whose refractive index is higher than that of the air. In the case where the refractive index is low, light emitted from the light-emitting layer 218 in an oblique direction is further refracted by the space 260, and light is emitted from an adjacent pixel in some cases. Thus, for example, the space 260 can be filled with a light-transmitting adhesive having high refractive index and capable of bonding the first substrate 201 and the second substrate 251 to each other. Alternatively, an inert gas such as nitrogen or argon or the like can be used.

Next, the details of the display panel in FIG. 2 and a method for manufacturing the display panel are described.

First, a method for forming the first substrate 201 provided with the transistor 230 for controlling drive of the light-emitting element, the light-emitting layer 218, and the like is described below.

A conductive layer is formed over the first substrate 201 having an insulating surface, and then, a first photolithography process is performed so that a resist mask is formed. An unnecessary portion of the conductive layer is etched away, so that a gate electrode layer 202 is formed. Etching is preferably performed so that a tapered shape is formed at end portions of the gate electrode layer 202 as illustrated in FIG. 2 because coverage with a film stacked thereover is improved.

Although there is no particular limitation on a substrate which can be used as the first substrate 201, it is necessary that the substrate have at least heat resistance high enough to withstand heat treatment to be performed later. For example, a glass substrate can be used as the first substrate 201.

In the case where the temperature of the heat treatment to be performed later is high, a glass substrate whose strain point is 730° C. or higher is preferably used as the glass substrate. For the glass substrate, a glass material such as aluminosilicate glass, aluminoborosilicate glass, or barium borosilicate glass is used, for example. Note that in general, by containing more barium oxide (BaO) than boron oxide ($B_2O_3$), a more practical heat-resistant glass substrate can be obtained. Thus, a glass substrate containing more BaO than $B_2O_3$ is preferably used.

Note that instead of the glass substrate, a substrate formed using an insulator, such as a ceramic substrate, a quartz substrate, or a sapphire substrate, may be used. Alternatively, crystallized glass or the like can be used. The display panel has a top-emission structure in which light is extracted through the second substrate 251; thus, a non-light-transmitting substrate such as a metal substrate can be used as the first substrate 201.

An insulating film which serves as a base film may be provided between the first substrate 201 and the gate electrode layer 202. The base film has a function of preventing diffusion of an impurity element from the first substrate 201, and can be formed to have a single-layer structure or a layered structure using one or more films selected from a silicon nitride film, a silicon oxide film, a silicon nitride oxide film, and a silicon oxynitride film.

The gate electrode layer 202 can be formed to have a single-layer structure or a layered structure using a metal material such as molybdenum, titanium, chromium, tantalum, tungsten, aluminum, copper, neodymium, or scandium, or an alloy material containing any of these metal materials as a main component.

Next, a gate insulating layer 204 is formed over the gate electrode layer 202. The gate insulating layer 204 can be formed to have a single-layer structure or a layered structure including a silicon oxide layer, a silicon nitride layer, a silicon oxynitride layer, a silicon nitride oxide layer, or an aluminum oxide layer by plasma-enhanced CVD, sputtering, or the like. For example, a silicon oxynitride film may be formed using $SiH_4$ and $N_2O$ as a deposition gas by plasma-enhanced CVD.

Next, a semiconductor layer is formed, and an island-shaped semiconductor layer 206 is formed through a second photolithography process.

The semiconductor layer 206 can be formed using a silicon semiconductor or an oxide semiconductor. Single crystal silicon, polycrystalline silicon, microcrystalline silicon, amorphous silicon, or the like can be used as the silicon semiconductor. A four-component metal oxide such as an In—Sn—Ga—Zn—O-based oxide semiconductor; a three-component metal oxide such as an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, or a Sn—Al—Zn—O-based oxide semiconductor; a two-component metal oxide such as an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, an In—Mg—O-based oxide semiconductor, or an In—Ga—O-based oxide semiconductor; a single-component metal oxide such as an In—O-based oxide semiconductor, a Sn—O-based oxide semiconductor, or a Zn—O-based oxide semiconductor; or the like can be used as the oxide semiconductor. Note that in this specification, for example, an In—Sn—Ga—Zn—O-based oxide semiconductor is a metal oxide containing indium (In), tin (Sn), gallium (Ga), and zinc (Zn), and there is no particular limitation on the stoichiometric proportion thereof. The oxide semiconductor may contain silicon. An oxide semiconductor which is an In—Ga—Zn—O-based metal oxide is preferably used as the semiconductor layer 206 so that the semiconductor layer has low off-state current because leakage current in an off state can be reduced.

Next, a conductive film is formed over the gate insulating layer 204 and the semiconductor layer 206, and a source and drain electrode layers 208 are formed through a third photolithography process.

As the conductive film used for the source and drain electrode layers 208, for example, a metal film including an element selected from Al, Cr, Cu, Ta, Ti, Mo, or W, a metal nitride film including the above element as its component (e.g., a titanium nitride film, a molybdenum nitride film, or a tungsten nitride film), or the like can be used. Alternatively, a film of a high-melting-point metal such as Ti, Mo, or W or a metal nitride film thereof (e.g., a titanium nitride film, a molybdenum nitride film, or a tungsten nitride film) may be formed over or/and below a metal film of Al, Cu, or the like. Alternatively, the conductive film used for the source and drain electrode layers 208 may be formed using a conductive metal oxide. Indium oxide ($In_2O_3$), tin oxide ($SnO_2$), zinc oxide (ZnO), ITO, indium oxide-zinc oxide ($In_2O_3$—ZnO), or any of these metal oxide materials containing silicon oxide can be used as the conductive metal oxide.

Next, an insulating layer 210 is formed over the semiconductor layer 206 and the source and drain electrode layers 208. An inorganic insulating film such as a silicon oxide film or a silicon oxynitride film can be used as the insulating layer 210.

Then, a second insulating layer 212 is formed over the insulating layer 210.

As the second insulating layer 212, an insulating film with a planarization function is preferably selected in order to reduce surface unevenness due to the transistor. For example, an organic material such as polyimide, acrylic, or benzocyclobutene can be used. Other than such organic materials, a low-dielectric constant material (a low-k material) or the like can be used. Note that the second insulating layer 212 may be formed by a stack of a plurality of insulating films formed using these materials.

Next, an opening which reaches the source and drain electrode layers 208 is formed in the second insulating layer 212 and the insulating layer 210 through a fourth photolithography process. As a method for forming the opening, dry etching, wet etching, or the like may be selected as appropriate.

Next, a conductive film is formed over the insulating layer 212 and the source and drain electrode layers 208, and a reflective electrode layer 214 is formed through a fifth photolithography process.

For the reflective electrode layer 214, a material which efficiently reflects light emitted from the light-emitting layer 218 is preferably used because light extraction efficiency can be improved. Note that the reflective electrode layer 214 may have a layered structure. For example, a conductive film of a metal oxide, titanium, or the like can be formed thin on a side which is in contact with the light-emitting layer 218, and a metal film with high reflectance (a film of aluminum, an alloy containing aluminum, silver, or the like) can be used on the other side. Such a structure is preferable because formation of an insulating film between the light-emitting layer 218 and the metal film with high reflectance (the film of aluminum, an alloy containing aluminum, silver, or the like) can be suppressed.

Next, a transparent conductive film is formed over the reflective electrode layer 214, and the first transparent electrode layer 220a is formed through a sixth photolithography process.

Then, a transparent conductive film is formed over the reflective electrode layer 214 and the first transparent electrode layer 220a, and the second transparent electrode layer 220b is formed through a seventh photolithography process. Note that only in the sub-pixel 240a, the first transparent electrode layer and the second transparent electrode layer are not formed.

Indium oxide ($In_2O_3$), tin oxide ($SnO_2$), zinc oxide (ZnO), ITO, indium oxide-zinc oxide ($In_2O_3$—ZnO), or any of these metal oxide materials containing silicon oxide can be used as a material which can be used for the first transparent electrode layer 220a and the second transparent electrode layer 220b.

Note that the method for forming the first transparent electrode layer 220a and the second transparent electrode layer 220b is not limited thereto. For example, a method can be used by which a transparent conductive film that has thickness needed for the second transparent electrode layer 220b is formed, only a portion to be the first transparent electrode layer 220a is subjected to dry etching, wet etching, or the like, and the transparent conductive film is removed to a thickness needed for the first transparent electrode layer 220a. Further, the second transparent electrode layer 220b may have a layered structure with the transparent conductive film used for the first transparent electrode layer 220a.

With the structure in which the transparent electrode layer is not formed only in the sub-pixel 240a as described above, the number of masks can be reduced, and cost can be reduced by a reduction of an unnecessary step.

Then, a partition 216 is formed over the reflective electrode layer 214, the first transparent electrode layer 220a, and the second transparent electrode layer 220b.

The partition 216 is formed using an organic insulating material or an inorganic insulating material. It is particularly preferable that the partition 216 be formed using a photosensitive resin material to have an opening over the reflective electrode layer 214 in the sub-pixel 240a, an opening over the first transparent electrode layer 220a in the sub-pixel 240b, and an opening over the second transparent electrode layer 220b in the sub-pixel 240c so that sidewalls of the openings have tilted surfaces with continuous curvature.

Then, the light-emitting layer 218 is formed over the reflective electrode layer 214, the first transparent electrode layer 220a, the second transparent electrode layer 220b, and the partition 216. The light-emitting layer 218 may have either a single-layer structure or a layered structure, and it is preferable that the spectrum of light emitted from the light-emitting layer 218 be light having a peak in each of red, green, and blue wavelength regions.

Next, the transflective electrode layer 219 is formed over the light-emitting layer 218.

Note that one of the reflective electrode layer 214 and the transflective electrode layer 219 functions as an anode of the light-emitting layer 218, and the other of the reflective electrode layer 214 and the transflective electrode layer 219 functions as a cathode of the light-emitting layer 218. It is preferable to use a substance having a high work function for the electrode which functions as an anode, and a substance having a low work function for the electrode which functions as a cathode.

Through the above steps, the first substrate 201 provided with the transistor 230 for controlling drive of the light-emitting element and the light-emitting layer 218 is formed.

Next, a method for forming the second substrate 251 provided with the light-blocking film 252, the color filter 254, and the overcoat 256 is described below.

First, a conductive film is formed on the second substrate 251, and the light-blocking film 252 is formed through an eighth photolithography process. The light-blocking film 252 can prevent color mixing among the sub-pixels. Note that the light-blocking film 252 is not necessarily provided.

A metal film with low reflectance of titanium, chromium, or the like, an organic resin film impregnated with a black pigment or a black dye, or the like can be used as the light-blocking film 252.

Then, the color filter 254 is formed on the second substrate 251 and the light-blocking film 252.

The color filter 254 is a colored layer for transmitting light in a specific wavelength range. For example, a red (R) color filter for transmitting light in a red wavelength range, a green (G) color filter for transmitting light in a green wavelength range, a blue (B) color filter for transmitting light in a blue wavelength range, or the like can be used. Each color filter is formed in a desired position with a known material by a printing method, an inkjet method, etching using a photolithography technique, or the like.

Here, a method of using three colors of R, G, and B is described; however, this embodiment is not limited thereto. A structure in which four colors of R, G, B, and Y (yellow) are used or a structure in which five or more colors are used may be employed.

Next, the overcoat 256 is formed on the light-blocking film 252 and the color filter 254. The overcoat 256 can be formed using an organic resin film of acrylic, polyimide, or the like. The overcoat 256 can prevent an impurity component or the like contained in the color filter 254 from diffusing into a light-emitting layer 218 side. Further, the overcoat 256 may have a layered structure of an organic resin film and an inorganic film. Silicon nitride, silicon oxide, or the like can be used for the inorganic insulating film. Note that it is possible not to provide the overcoat 256.

Through the above steps, the second substrate 251 provided with the light-blocking film 252, the color filter 254, and the overcoat 256 is formed.

Further, the first substrate 201 and the second substrate 251 are aligned and attached to each other to be the display panel. There is no particular limitation on the method for attaching the first substrate 201 and the second substrate 251 to each other, and the first substrate 201 and the second substrate 251 can be attached to each other with a light-transmitting adhesive whose refractive index is high, for example.

As described above, in the display panel, the optical distance is changed between the light-emitting element and the sub-pixel including the light-emitting element that has emission intensity in the blue region, the sub-pixel including the light-emitting element that has emission intensity in the green region, and the sub-pixel including the light-emitting element that has emission intensity in the red region. When a desired spectrum is intensified by a micro-cavity in each light-emitting element, a display panel with high color purity can be obtained. Further, since only the sub-pixel including the light-emitting element that emits light of a blue wavelength does not include the transparent electrode layer, the number of steps and cost can be reduced.

Note that here, the display panel that has a top-emission (TE) structure in which a light-emitting element emitting white light and a color filter (CF) are used in combination (hereinafter abbreviated as a white+CF+TE structure) is described; however, a display panel that has a top-emission structure in which light-emitting elements are formed by a separate coloring method (hereinafter referred to as a separate coloring+TE structure) can be used as the display panel. The separate coloring method is a method for separately coloring R, G, and B materials in pixels by vapor deposition or the like.

Here, comparison between the display panel with the white+CF+TE structure and the display panel with the separate coloring+TE structure is described below.

First, in the white+CF+TE structure, coloring is performed using a color filter; thus, a color filter is needed. In contrast, in the separate coloring+TE structure, coloring is performed by separately coloring pixels by vapor deposition or the like; thus, a color filter is not needed. Consequently, in the separate coloring+TE structure, light emission at high luminance or low-power drive is possible.

Note that although the white+CF+TE structure needs a color filter, the separate coloring+TE structure needs a metal mask or the like for separate coloring. Separate coloring can be performed by an inkjet method or the like without a metal mask; however, it is difficult to employ such a method because of many technical problems. In the case where a metal mask is used, a vapor deposition material is also deposited on the metal mask; thus, material use efficiency is low and cost is high. Further, the metal mask is in contact with the light-emitting element, so that yield is decreased because of damage to the light-emitting element or generation of a scratch, a particle, or the like due to contact. Consequently, the white+CF+TE structure is better in terms of manufacturing cost or productivity.

In addition, it is possible to eliminate a polarizing plate from the white+CF+TE structure. In contrast, the separate coloring+TE structure needs a polarizing plate. An improvement in color purity by using a micro-cavity can be achieved in both the white+CF+TE structure and the separate coloring+TE structure.

In the separate coloring+TE structure, it is necessary to separately color the pixels and to provide a region necessary for separate coloring between the pixels; thus, the size of one pixel cannot be increased. Consequently, the aperture ratio is markedly decreased. In contrast, in the white+CF+TE structure, it is not necessary to provide a region necessary for separate coloring between the pixels; thus, the size of one pixel can be increased. Consequently, the aperture ratio can be improved.

In the case where the display panel is made large, a technique for manufacturing the display panel is essential. It is difficult to employ the separate coloring+TE structure because a metal mask is needed for separate coloring and a technique of a metal mask and production equipment that are compatible with a large display panel are not established. Even if the technique of a metal mask and the production equipment that are compatible with a large display panel are established, the problem of material use efficiency, i.e., the fact that a vapor deposition material is also deposited on a metal mask, is not solved. In contrast, the white+CF+TE structure is preferable because a metal mask is not needed and manufacturing can be performed using conventional production equipment.

An apparatus for manufacturing a display panel greatly influence the productivity of a display panel. For example, in the case where a light-emitting element has a layered structure of a plurality of films, it is preferable that the apparatus for manufacturing a display panel be an in-line apparatus or a multi-chamber apparatus and that a plurality of vapor deposition sources be formed on a substrate once or successively. In the separate coloring+TE structure, it is necessary to separately color pixels and to manufacture the display panel while replacing metal masks so that the pixels are formed in desired positions. Since metal masks are replaced, it is difficult to use an in-line manufacturing apparatus or a multi-chamber manufacturing apparatus. In contrast, in the white+CF+TE structure, it is easy to use an in-line manufacturing apparatus or a multi-chamber manufacturing apparatus because a metal mask is not needed.

<Modification Example of Display Panel 10>

A structural example of the display panel 10 that is different from the specific example of the display panel 10 in FIG. 2 is described with reference to FIGS. 3A and 3B. Note that FIGS. 3A and 3B are cross-sectional views of the sub-pixel that includes the light-emitting element emitting white light by organic electroluminescence and the color filter that transmits light in a specific wavelength range included in the white light emitted from the light-emitting element and changes the white light into light with a chromatic color.

Although the display panel 10 in FIG. 2 has a top-emission structure in which light is extracted from a surface that is opposite to the substrate provided with the transistor and the light-emitting element, a display panel with a bottom-emission structure is described below.

The display panel 10 with a bottom-emission structure is described with reference to FIG. 3A.

Figure 3A:
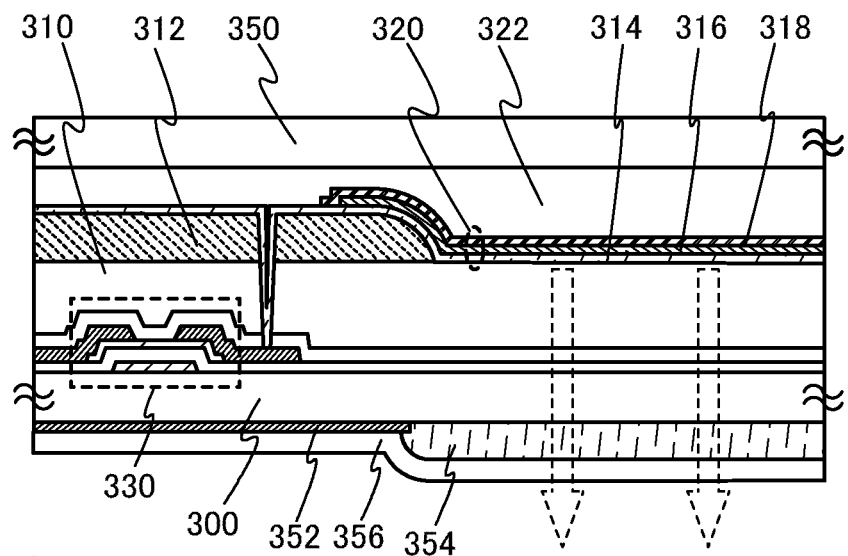
FIGS. 3A and 3B are cross-sectional views each illustrating a structural example of a display panel.
Figure 3B:
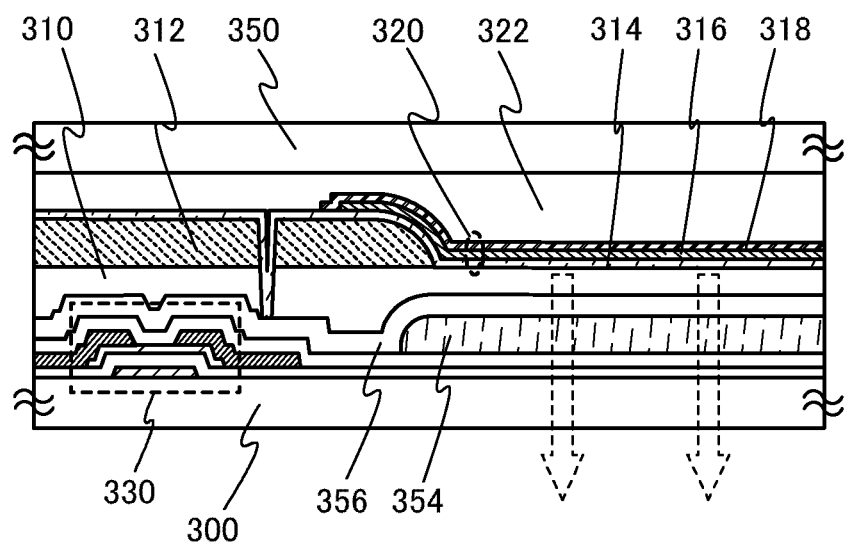

In FIG. 3A, a first substrate 300, a second substrate 350, a transistor 330 and a light-emitting element 320 that are held between the first substrate 300 and the second substrate 350, and a color filter 354 provided on a display surface (a surface to which light from the light-emitting element 320 is emitted) side of the first substrate 300 are included.

Although there is no particular limitation on a substrate which can be used as the first substrate 300, it is necessary that the substrate have at least heat resistance high enough to withstand heat treatment to be performed later. For example, a glass substrate can be used as the first substrate 300.

In the case where the temperature of the heat treatment to be performed later is high, a glass substrate whose strain point is 730° C. or higher is preferably used as the glass substrate. For the glass substrate, a glass material such as aluminosilicate glass, aluminoborosilicate glass, or barium borosilicate glass is used, for example. Note that in general, by containing more barium oxide (BaO) than boron oxide ($B_2O_3$), a more practical heat-resistant glass substrate can be obtained. Thus, a glass substrate containing more BaO than $B_2O_3$ is preferably used.

The transistor 330 can be formed in a manner similar to that of the transistor 230 in FIG. 2.

The light-emitting element 320 is formed over an insulating layer 310 and a partition 312 that are formed over the transistor 330. A light-emitting layer 316 and a second electrode 318 are sequentially stacked over a first electrode 314 that is electrically connected to the transistor 330.

For the insulating layer 310, a material that can flatten unevenness due to the transistor 330 is preferably used. A material that can transmit light from the light-emitting element 320 is preferably used. For example, an acrylic resin having a high light-transmitting property can be used for the insulating layer 310. An organic resin film of polyimide, acrylic, polyamide, epoxy, or the like, an inorganic insulating film, or organic polysiloxane can be used for the partition 312.

A conductive film which transmits visible light is used as the first electrode 314. Indium oxide ($In_2O_3$), tin oxide ($SnO_2$), zinc oxide (ZnO), ITO, indium oxide-zinc oxide ($In_2O_3$—ZnO), or any of these metal oxide materials containing silicon oxide can be used as the conductive film which transmits visible light, for example. Alternatively, a metal thin film having thickness small enough to transmit light (preferably, approximately 1 nm to 30 nm) can be used.

The light-emitting layer 316 can be formed in a manner similar to that of the light-emitting layer 218 in FIG. 2.

For the second electrode 318, a material which efficiently reflects light emitted from the light-emitting layer 316 is preferably used because light extraction efficiency can be improved. Note that the second electrode 318 may have a layered structure. For example, for the second electrode 318, a conductive film of a metal oxide, titanium, or the like can be formed thin on a side which is in contact with the light-emitting layer 316 that contains a light-emitting substance, and a metal film with high reflectance (a film of aluminum, an alloy containing aluminum, silver, or the like) can be used on the other side. Such a structure is preferable because formation of an insulating film between the light-emitting layer 316 and the metal film with high reflectance can be suppressed.

Any material can be used for the second substrate 350 as long as it can encapsulate the light-emitting element 320 and a transistor 330. Further, since the light-emitting device in FIG. 3A has the bottom-emission structure, a non-light-transmitting substrate may be used. For example, a glass substrate, a metal substrate, or the like can be used as appropriate as the second substrate 350.

A space 322 can be formed using a material and a method which are similar to those of the space 260. Further, a desiccant that can remove moisture or the like entering the light-emitting element 320 may be encapsulated in the space 322.

On a surface of the first substrate 300 to which light is emitted, the light-blocking film 352 functioning as a black matrix, a color filter 354, and an overcoat 356 are provided. The color filter 354 is a colored layer and changes white light emitted from each light-emitting element into light with a chromatic color (e.g., blue, green, or red).

In the display panel 10 according to one embodiment of the present invention, the color filter 354 and the overcoat 356 can be held between the first substrate 300 and the second substrate 350 (see FIG. 3B).

<Structural Example of Pixel 100>

Figure 4A:
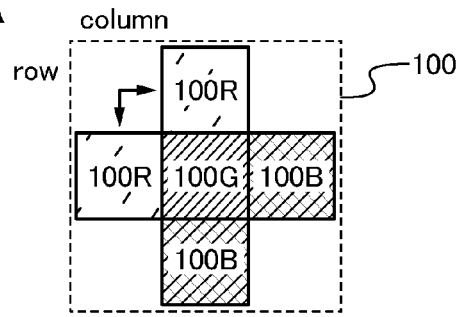
FIG. 4A is a diagram illustrating an example of an arrangement of sub-pixels included in a pixel.
Figure 4B:
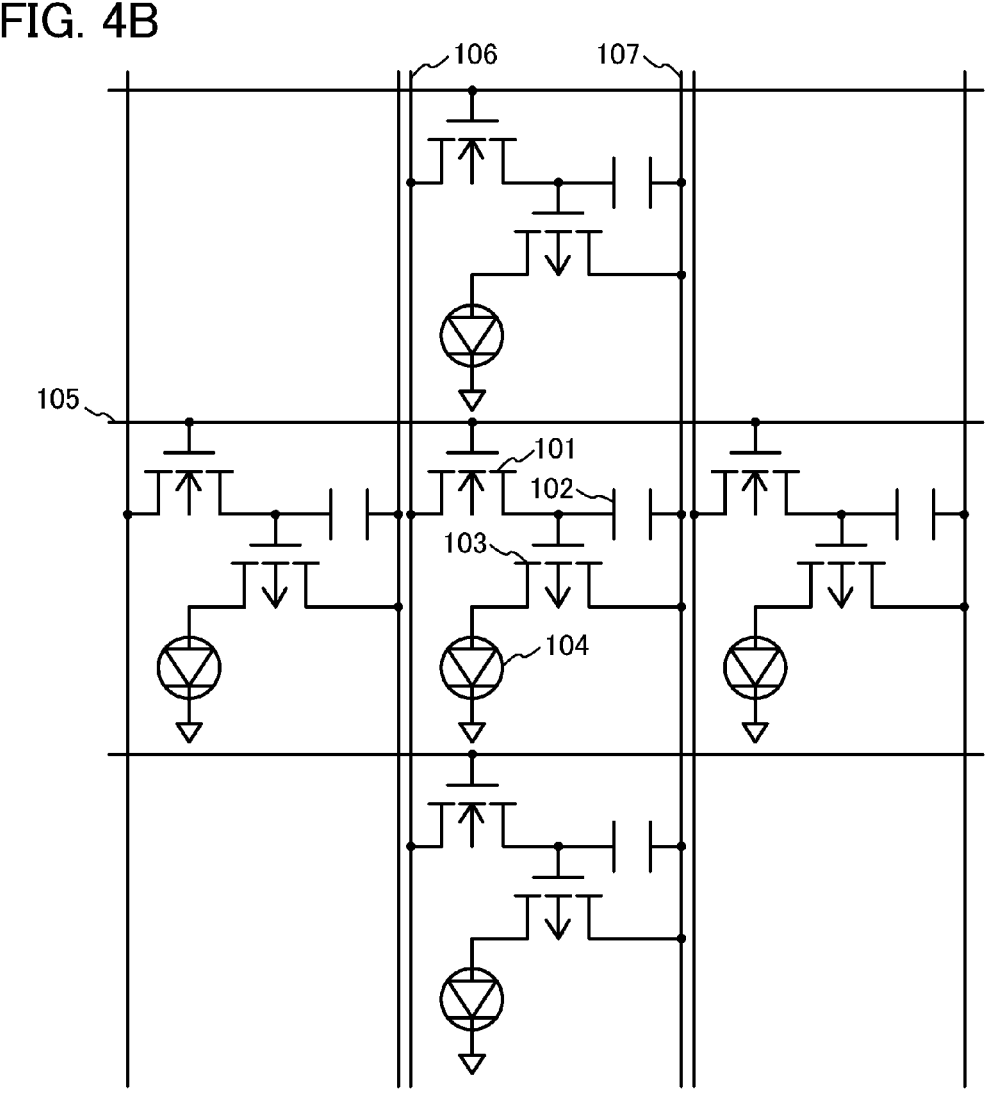
FIG. 4B is a diagram illustrating an example of an equivalent circuit of a pixel.

A structural example of a pixel 100 included in the display panel 10 is described with reference to FIGS. 4A and 4B. Note that FIG. 4A is a diagram which illustrates an example of an arrangement of sub-pixels included in the pixel 100. FIG. 4B is a diagram which illustrates an example of an equivalent circuit of the pixel illustrated in FIG. 4A.

The pixel 100 illustrated in FIG. 4A includes two sub-pixels 100R which are selected to emit or not emit red (R) light, one sub-pixel 100G which is selected to emit or not emit green (G) light, and two sub-pixels 100B which are selected to emit or not emit blue (B) light. In the pixel 100, the sub-pixel 100G is centered, and the sub-pixel 100R and the sub-pixel 100B are arranged in this order in each of the row direction (in FIG. 4A, the direction of a downward arrow) and the column direction (in FIG. 4A, the direction of a right-pointing arrow).

The sub-pixels 100R, 100G, and 100B illustrated in FIG. 4A have a common circuit configuration (see FIG. 4B). Specifically, each of the sub-pixels 100R, 100G, and 100B includes a transistor 101, a transistor 103, a capacitor 102, and an organic EL element 104. The transistor 101 is an element which controls an input of an image signal to a sub-pixel. The transistor 103 is an element which supplies a current corresponding to the image signal to the organic EL element 104. The capacitor 102 is an element which has a function of holding the image signal. The organic EL element 104 is a light-emitting element whose luminance changes depending on a current value inputted through the transistor 103.

Hereinafter, a connection relation between these elements is described.

A gate of the transistor 101 is electrically connected to the scan line 105 and one of a source and a drain thereof is electrically connected to the signal line 106.

One electrode of the capacitor 102 is electrically connected to the other of the source and the drain of the transistor 101, and the other electrode of the capacitor 102 is electrically connected to a power supply line 107.

A gate of the transistor 103 is electrically connected to the other of the source and the drain of the transistor 101 and the one electrode of the capacitor 102, and one of a source and a drain of the transistor 103 is electrically connected to the power supply line 107.

An anode of the organic EL element 104 is electrically connected to the other of the source and the drain of the transistor 103, and a cathode of the organic EL element 104 is electrically connected to a wiring for supplying a common potential.

Note that the scan line 105 is a wiring for supplying a signal for controlling switching of the transistor 101. The signal line 106 is a wiring for supplying an image signal to a sub-pixel. The power supply line 107 is a wiring to which a potential which is different from the common potential is supplied. Here, a potential higher than the common potential is supplied to the power supply line 107. FIG. 4B illustrates, as an example, the case where a p-channel transistor is used as the transistor 103 and a potential higher than the common potential is supplied to the power supply line 107. However, the following structure can also be used: an n-channel transistor is used as the transistor 103 and the lower potential than the common potential is supplied to the power supply line 107. Moreover, in FIG. 4B, the structure in which an n-channel transistor is used as the transistor 101 is illustrated as an example; however, a structure in which a p-channel transistor is used as the transistor 101 can also be used. Further, a structure in which the potential supplied to the power supply line 107 is changed as appropriate (variable potential) can also be used. Furthermore, a structure in which the common potential is changed as appropriate can also be used.

In the sub-pixels illustrated in FIG. 4B, the potential of the signal line 106 at the time when the potential of the scan line 105 is set to a high level is inputted as the image signal. This is because the transistor 101 is turned on when the potential of the scan line 105 is set to a high level. Then, the potential of the scan line 105 is set to a low level, whereby the image signal is held in the capacitor 102. It is because the potential of the scan line 105 is set to a low level, whereby the transistor 101 is turned off. Here, the image signal is supplied to the gate of the transistor 103, and a current drive capability of the transistor 103 is determined depending on the image signal (the specific potential). Accordingly, the current value supplied to the organic EL element 104 is determined depending on the image signal. As a result, the organic EL element 104 emits light with a luminance determined by the current value. In other words, the image signal inputted to the sub-pixel is controlled, whereby the luminance of the organic EL element 104 can be controlled.

In the pixel illustrated in FIG. 4B, the image signal inputted to each of the five sub-pixels is controlled, whereby light which exhibits a desirable color can be formed by mixture of red (R) light, green (G) light, and blue (B) light.

<Modification Example of Pixel 100>

Structural examples of a pixel 100 which are different from that illustrated in FIGS. 4A and 4B are described with reference to FIGS. 5A to 5F. Note that FIGS. 5A to 5F are diagrams which illustrate examples of the arrangement of the sub-pixels included in the pixel 100.

Figure 5A:
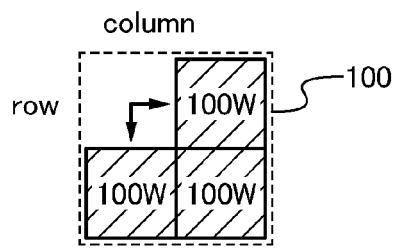
FIGS. 5A to 5F are examples of an arrangement of sub-pixels included in a pixel.

A pixel 100 illustrated in FIG. 5A includes three sub-pixels 100W which are selected to emit or not emit white (W) light. Note that in the pixel 100 illustrated in FIG. 5A, the other two of the sub-pixels 100W are arranged in the row direction and the column direction with respect to the other one sub-pixel 100W. A display device including the pixel 100 illustrated in FIG. 5A performs monochrome display.

Figure 5B:
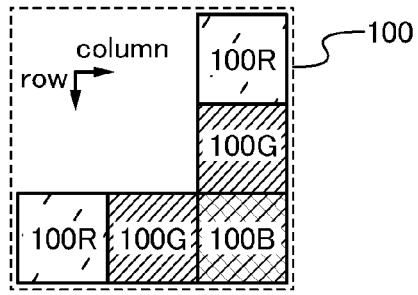

A pixel 100 illustrated in FIG. 5B includes two sub-pixels 100R which are selected to emit or not emit red (R) light, two sub-pixels 100G which are selected to emit or not emit green (G) light, and one sub-pixel 100B which is selected to emit or not emit blue (B) light. Note that in the pixel 100 illustrated in FIG. 5B, the sub-pixel 100R and the sub-pixel 100G are arranged in this order in each of the row direction and the column direction with respect to the sub-pixel 100B which is arranged in the corner. In the pixel 100 illustrated in FIG. 5B, light which exhibits a desirable color can be formed by a color mixture as in the case of the pixel 100 illustrated in FIGS. 4A and 4B.

Figure 5C:
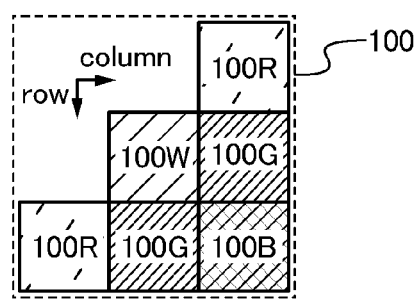

A pixel 100 illustrated in FIG. 5C includes two sub-pixels 100R which are selected to emit or not emit red (R) light, two sub-pixels 100G which are selected to emit or not emit green (G) light, one sub-pixel 100B which is selected to emit or not emit blue (B) light, and one sub-pixel 100W which is selected to emit or not emit white light (W). Note that in the pixel 100 illustrated in FIG. 5C, the sub-pixel 100R and the sub-pixel 100G are arranged in this order in each of the row direction and the column direction with respect to the sub-pixel 100B which is arranged in the corner and the sub-pixel 100W is arranged at the center. In the pixel 100 illustrated in FIG. 5C, light which exhibits a desirable color can be formed by a color mixture as in the case of the pixel 100 illustrated in FIGS. 4A and 4B. Moreover, in the pixel 100 illustrated in FIG. 5C, display with a high contrast ratio can be performed by control of luminance of the sub-pixel 100W.

Figure 5D:
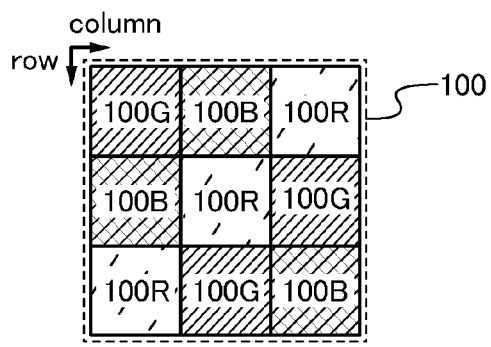

A pixel 100 illustrated in FIG. 5D includes three sub-pixels 100R which are selected to emit or not emit red (R) light, three sub-pixels 100G which are selected to emit or not emit green (G) light, and three sub-pixels 100B which are selected to emit or not emit blue (B) light, which are arranged in three rows and three columns. Note that in the pixel 100 illustrated in FIG. 5D, three sub-pixels 100R, 100G, and 100B are arranged in each row and each column. In the pixel 100 illustrated in FIG. 5D, light which exhibits a desirable color can be formed by a color mixture as in the case of the pixel 100 illustrated in FIGS. 4A and 4B. Moreover, in the pixel 100 illustrated in FIG. 5D, display with high definition can be performed by improving an aperture ratio in 2D display and using three sub-pixels arranged in each row and each column as display element units.

Figure 5E:
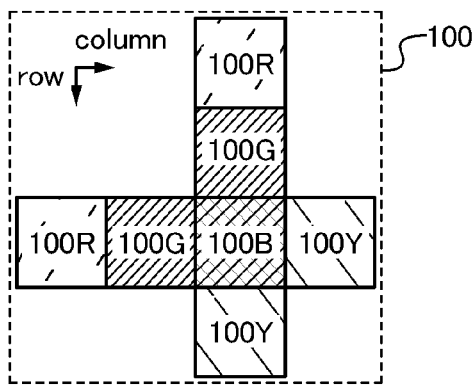

A pixel 100 illustrated in FIG. 5E includes two sub-pixels 100R which are selected to emit or not emit red (R) light, two sub-pixels 100G which are selected to emit or not emit green (G) light, one sub-pixel 100B which is selected to emit or not emit blue (B) light, and two sub-pixels 100Y which is selected to emit or not emit yellow light (Y). Note that in the pixel 100 illustrated in FIG. 5E, the sub-pixel 100R, the sub-pixel 100G, and the sub-pixel 100Y are arranged in this order in each of the row direction and the column direction with respect to the sub-pixel 100B which is arranged in the lower-right portion. In the pixel 100 illustrated in FIG. 5E, light which exhibits a desirable color can be formed by a color mixture as in the case of the pixel 100 illustrated in FIGS. 4A and 4B. Moreover, in the pixel 100 illustrated in FIG. 5E, a color gamut of light which is formed can be enlarged.

Figure 5F:
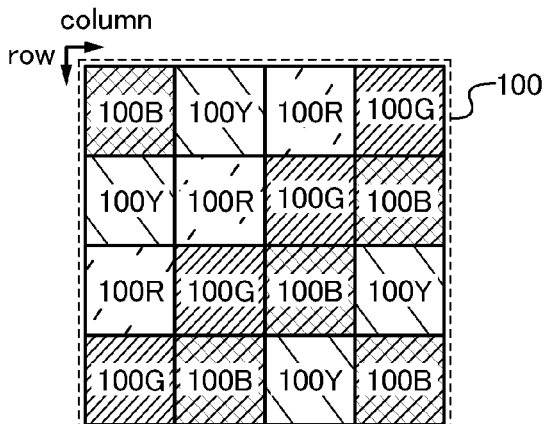

A pixel 100 illustrated in FIG. 5F includes four sub-pixels 100R which are selected to emit or not emit red (R) light, four sub-pixels 100G which are selected to emit or not emit green (G) light, four sub-pixels 100B which are selected to emit or not emit blue (B) light, and four sub-pixels 100Y which are selected to emit or not emit yellow light (Y), which are arranged in four rows and four columns. Note that in the pixel 100 illustrated in FIG. 5F, four sub-pixels 100R, 100G, and 100B are arranged in each row and each column. In the pixel 100 illustrated in FIG. 5F, light which exhibits a desirable color can be formed by a color mixture as in the case of the pixel 100 illustrated in FIGS. 4A and 4B. Moreover, in the pixel 100 illustrated in FIG. 5F, display with high definition can be performed and a color gamut of light which is formed can be enlarged by improving an aperture ratio in 2D display and using four sub-pixels arranged in each row and each column as display element units.

Note that a structure of an arrangement of the sub-pixels included in the pixel 100 is not limited to the structures in FIG. 4A and FIGS. 5A to 5F. For example, five or more different kinds of sub-pixels can be arranged in each row and each column, or a plurality of sub-pixels can be arranged in n rows and m columns (n and m are each a natural number of 2 or more (n≠m)).

Further, the shape of the sub-pixel included in the pixel 100 is not limited to a square shape or a substantially square shape. The sub-pixel may have any shape as long as the shape of a display area (a plurality of sub-pixels which perform display) in the pixel is not significantly changed, between when a plurality of sub-pixels is arranged in the row direction and when the same number of sub-pixels including one of the plurality of sub-pixels are arranged in the column direction. For example, the shape of the sub-pixel can be a circular shape or a substantially circular shape, or a regular hexagonal shape or a substantially regular hexagonal shape. However, in terms of an aperture ratio or the like, the shape of the sub-pixel is preferably a square shape or a substantially square shape.

As a circuit configuration of a sub-pixel included in the pixel 100 illustrated in any of FIGS. 5A to 5F, the circuit configuration illustrated in FIG. 4B can be used.

Figures 6A, 6B:
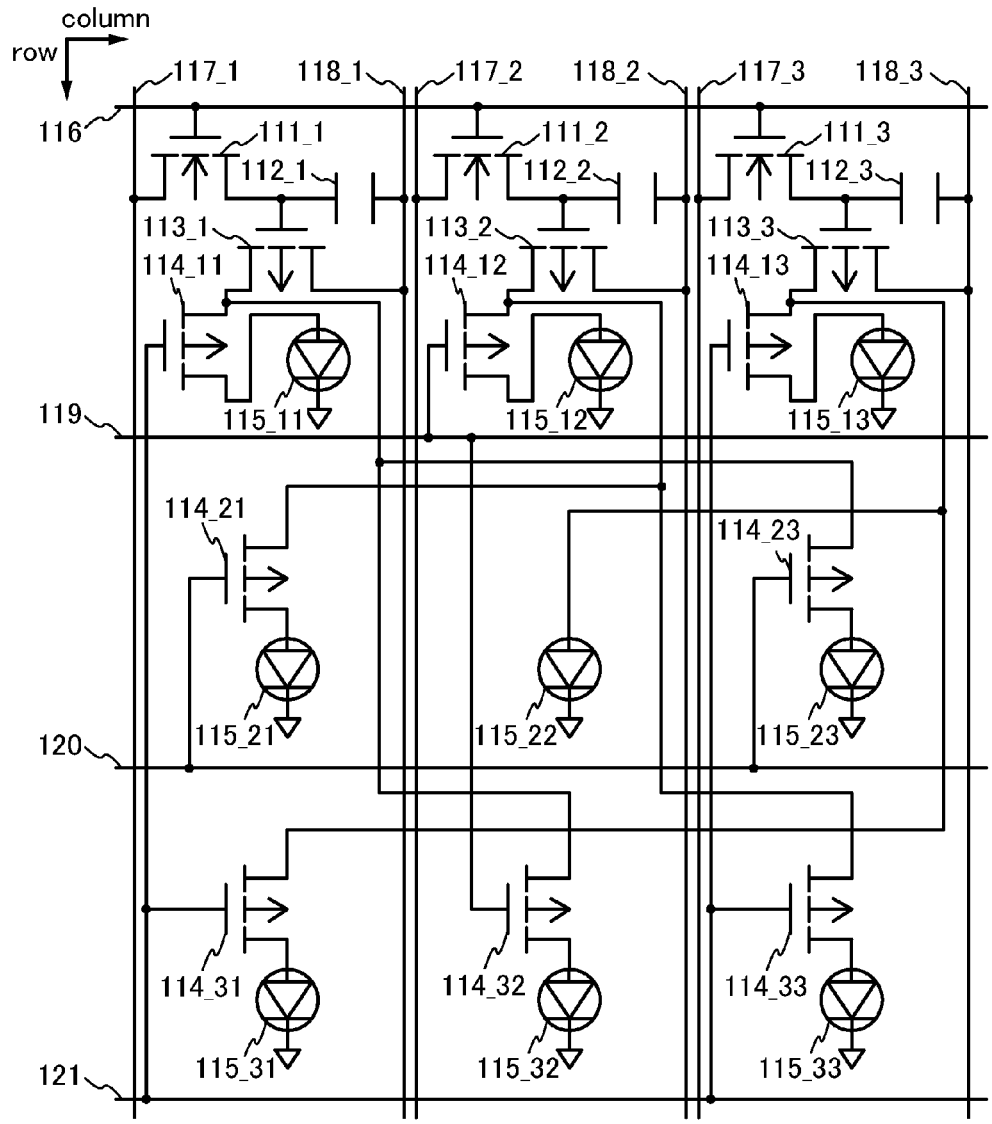
FIG. 6A is a diagram illustrating an example of an equivalent circuit of a pixel.
FIG. 6B is a diagram illustrating potentials of wirings in each display state.

Further, a circuit configuration illustrated in FIG. 6A can be applied to the pixel 100 illustrated in any of FIGS. 5A to 5F. In FIG. 6A, the circuit configuration corresponding to FIG. 5D is illustrated.

In the pixel illustrated in FIG. 6A, each of the three sub-pixels arranged in the first row includes a transistor 111_$a$, a transistor 113_$a$, a transistor 114_1$a$, a capacitor 112_$a$, and an organic EL element 115_1$a$ ($a$ is any one of natural numbers 1, 2, and 3). Each of the sub-pixels arranged in the second row and the first column and in the second row and the third column includes a transistor 114_2$b$ and an organic EL element 115_2$b$ ($b$ is 1 or 3). Each of the three sub-pixels arranged in the third row includes a transistor 114_3$a$ and an organic EL element 115_3$a$. The sub-pixel arranged in the second row and the second column includes an organic EL element 115_22.

In the pixel illustrated in FIG. 6A, the transistor 111_$a$ is an element which controls an input of an image signal to a sub-pixel. The transistor 113_$a$ is an element which supplies a current corresponding to the image signal. The transistors 114_1$a$, 114_2$b$, and 114_3$a$ are elements which each select whether current supplied through the transistor 113_$a$ is supplied to an organic EL element or not. The capacitor 112_$a$ is an element which has a function of holding the image signal. The organic EL elements 115_1$a$, 115_2$b$, 115_3$a$, and 115_22 are light-emitting elements whose luminance changes depending on a current value supplied.

Hereinafter, a connection relation between these elements is described.

The gate of the transistor 111_$a$ is electrically connected to the scan line 116 and one of a source and a drain thereof is electrically connected to the signal line 117_$a$.

One electrode of the capacitor 112_$a$ is electrically connected to the other of the source and the drain of the transistor 111_$a$, and the other electrode of the capacitor 112_$a$ is electrically connected to a power supply line 118_$a$.

A gate of the transistor 113_$a$ is electrically connected to the other of the source and the drain of the transistor 111_$a$ and the one electrode of the capacitor 112_$a$, and one of a source and a drain of the transistor 113_$a$ is electrically connected to the power supply line 118_$a$.

Gates of the transistors 114_11, 114_13, 114_31, and 114_33 are electrically connected to a display switching control signal line 121. Gates of the transistors 114_12 and 114_32 are electrically connected to a row direction display control signal line 119. Gates of the transistors 114_21 and 114_23 are electrically connected to a column direction display control signal line 120.

One of a source and a drain of each of the transistors 114_11, 114_23, and 114_32 is electrically connected to the other of the source and the drain of the transistor 113_1. One of a source and a drain of each of the transistors 114_12, 114_21, and 114_33 is electrically connected to the other of the source and the drain of the transistor 113_2. One of a source and a drain of each of the transistors 114_13 and 114_31 is electrically connected to the other of the source and the drain of the transistor 113_3.

An anode of the organic EL element 115_1a is electrically connected to the other of the source and the drain of the transistors 114_1a. An anode of the organic EL element 115_2b is electrically connected to the other of the source and the drain of the transistors 114_2b. An anode of the organic EL element 115_3a is electrically connected to the other of the source and the drain of the transistors 114_3a. An anode of the organic EL element 115_22 is electrically connected to the other of the source and the drain of the transistors 113_3.

A cathode of the organic EL element 115__aa is electrically connected to a wiring for supplying a common potential.

The pixel illustrated in FIG. 6A is different from that illustrated in FIG. 4B in that the transistor 111__a, the transistor 113__a, and the capacitor 112__a are shared by the three sub-pixels which are selected to emit or not emit light of the same color, and that any one of the transistors 114_1a, 114_2b, and 114_3a is added to each of the sub-pixels arranged in the b-th row and the sub-pixel arranged in the second row and the b-th column.

The scan line 116, the signal line 117__a, and the power supply line 118__a are wirings which have the same function as the scan line 105, the signal line 106, and the power supply line 107 illustrated in FIG. 4B, respectively; therefore the above description is employed here.

The row direction display control signal line 119 is a wiring which selects whether display is performed or not in the sub-pixel arranged in the b-th row and the second column. Specifically, the row direction display control signal line 119 supplies a low-level potential (L) to the gate of the transistor 114__b2 in the following cases: 3D display is performed when display is performed using the sub-pixel arranged in the a-th row and the second column and by displaying a black image in a sub-pixel arranged in the a-th row and the b-th column (in the case where a stripe-shaped parallax barrier having a long axis in the row direction is provided in the shutter panel 20), and when 2D display is performed. The row direction display control signal line 119 supplies a high-level potential (H) to the gate of the transistor 114__b2 in the other cases (see FIG. 6B).

The column direction display control signal line 120 is a wiring which selects whether display is performed or not in the sub-pixel arranged in the second row and the b-th column. Specifically, the column direction display control signal line 120 supplies a low-level potential (L) to the gate of the transistor 114_2b in the following cases: 3D display is performed when display is performed using the sub-pixel arranged in the second row and the a-th column and by displaying a black image in the sub-pixel arranged in the b-th row and the a-th column (in the case where a stripe-shaped parallax barrier having a long axis in the column direction in the shutter panel 20), and when 2D display is performed. The column direction display control signal line 120 supplies a high-level potential (H) to the gate of the transistor 114_2b in the other cases (see FIG. 6B).

The display switching control signal line 121 is a wiring which selects whether display is performed or not in a sub-pixel arranged in the b-th row and the b-th column. Specifically, the display switching control signal line 121 supplies a low-level potential (L) to the gate of the transistor 114__bb in the case where 2D display is performed, and supplies a high-level potential (H) to the gate of the transistor 114__bb in the other cases (see FIG. 6B).

In the pixel illustrated in FIG. 6A, luminance of the organic EL element included in each of the sub-pixels is controlled by the image signal inputted through the transistor 111__a, the potential of the row direction display control signal line 119, the potential of the column direction display control signal line 120, and the potential of the display switching control signal line 121. In the pixel illustrated in FIG. 6A, as compared to the pixel illustrated in FIG. 4B, the amount of variation in current value which is supplied to the organic EL element included in the sub-pixel can be reduced. This is because, in the pixel illustrated in FIG. 6A, a current value which is supplied to the organic EL element is determined by the transistor 113__a shared by three sub-pixels, while in the pixel illustrated in FIG. 4B, a current value which is supplied to the organic EL element is determined by the transistor 103 included in each of the sub-pixels. That is, the number of elements which determine a current value supplied to the organic EL element (the number of a population) in the former case is smaller than that of elements which determine a current value supplied to the organic EL element in the latter case. Therefore, statistical variation of the current value supplied to the organic EL element in the former case can be suppressed as compared to statistical variation of the current value supplied to the organic EL element in the latter case.

<Example of Display State>

Figure 7A:
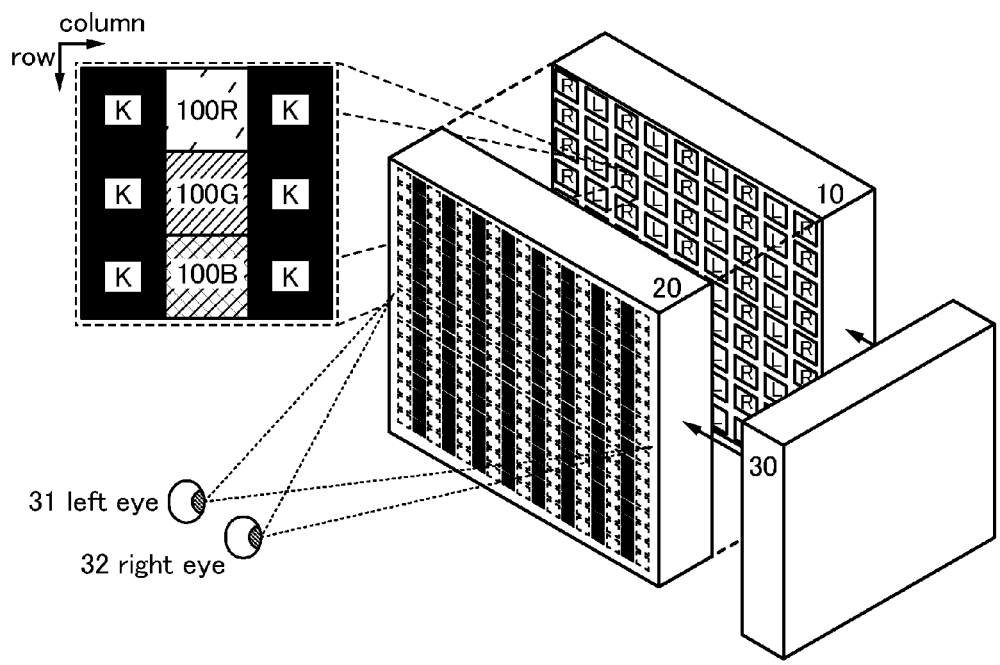
FIGS. 7A and 7B are diagrams illustrating examples of a display state of a display device.
Figure 7B:
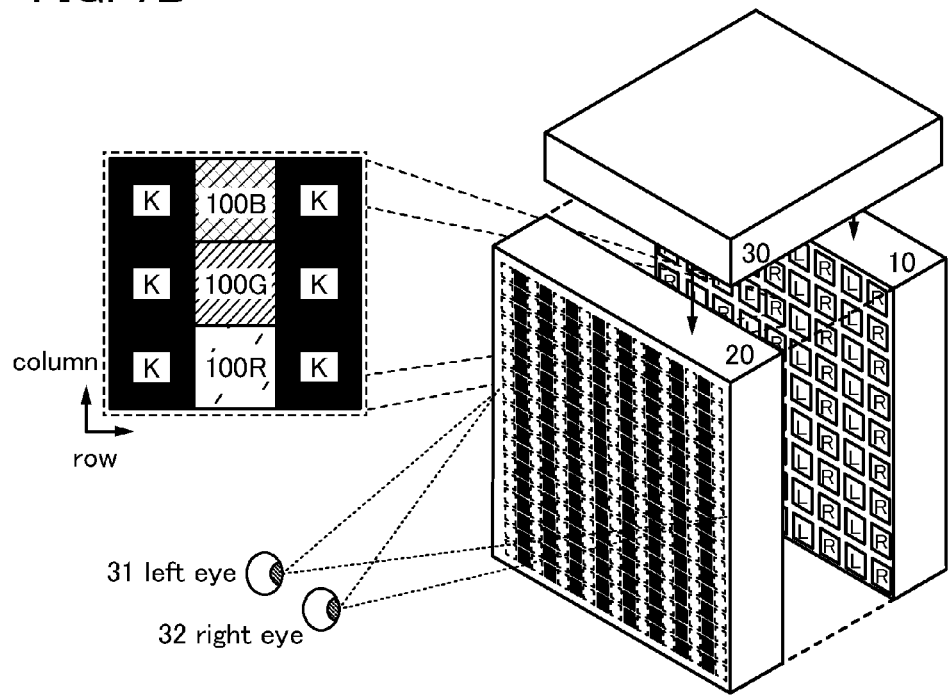

FIGS. 7A and 7B are diagrams illustrating examples of a display state of the above display device. Specifically, FIG. 7A is a diagram illustrating an example in the case where the viewer sees 3D display at a state, and FIG. 7B is a diagram illustrating an example in the case where the viewer sees 3D display at a certain state in which the display device is rotated by 90° to the left (counterclockwise) from the state in FIG. 7A. In FIGS. 7A and 7B, the structure in which each of the pixels includes sub-pixels arranged in three rows and three columns (see FIG. 5D) is illustrated as an example. In the display panel 10 illustrated in FIGS. 7A and 7B, a pixel denoted by R represents a pixel performing display for the right eye, and a pixel denoted by L represents a pixel performing display for the left eye. In the shutter panel 20 illustrated in FIGS. 7A and 7B, an optical shutter in a region colored with black represents an optical shutter in a light-shielding state, and the other optical shutters represent optical shutters in a light-transmitting state.

In the display state illustrated in FIG. 7A, in each of the plurality of pixels included in the display panel 10, the three sub-pixels arranged in the row direction emit light, whereby an image is displayed, and the other sub-pixels do not emit light, whereby black display (K) is performed. Moreover, a part of the plurality of optical shutters included in the shutter panel 20 is brought into a light-shielding state, and the other part is brought into a light-transmitting state, whereby a stripe-shaped parallax barrier having a long axis in the row direction is arranged.

In the above display device, it is possible that three sub-pixels of nine sub-pixels included in each of the pixels display an image and the other six sub-pixels of the nine sub-pixels do not display an image. That is, a display area in the pixel can be reduced. Therefore, occurrence of crosstalk can be suppressed.

In the display device, an image can be displayed in the three sub-pixels arranged linearly along the long axis direction of a stripe-shaped parallax barrier. Therefore, even if crosstalk occurs, a probability that a plurality of sub-pixels is viewed at the same time can be higher than probability that only one of the three sub-pixels is viewed. Generally, adjacent pixels display images with similar hues in many cases regardless of whether the pixel is a pixel performing display for the right eye or a pixel performing display for the left eye. Therefore, in the display device, even if crosstalk occurs, the change of the hue of the image which is viewed can be reduced.

In the display state illustrated in FIG. 7B, in each of the plurality of pixels included in the display panel 10, the three sub-pixels arranged in the column direction emit light, whereby an image is displayed, and the other sub-pixels do not emit light, whereby black display (K) is performed. Moreover, a part of the plurality of optical shutters included in the shutter panel 20 is brought into a light-shielding state, and the other part is brought into a light-transmitting state, whereby a stripe-shaped parallax barrier having a long axis in the column direction is arranged.

In the above display device, the sub-pixel has a square shape or a substantially square shape. Thus, even when the plurality of sub-pixels arranged along the long axis direction of a stripe-shaped parallax barrier is selected as sub-pixels performing display, the shape of the display area in the pixel (the plurality of sub-pixels performing display) does not change greatly. Therefore, even in the case where the direction of the display portion with respect to the viewer is changed (in the case where the arranged parallax barrier is changed), the occurrence of crosstalk can be suppressed regardless of the direction, and the change in the hue of the image in the case where crosstalk occurs can be reduced.

<Modification Example of Display State>

Figure 8A:
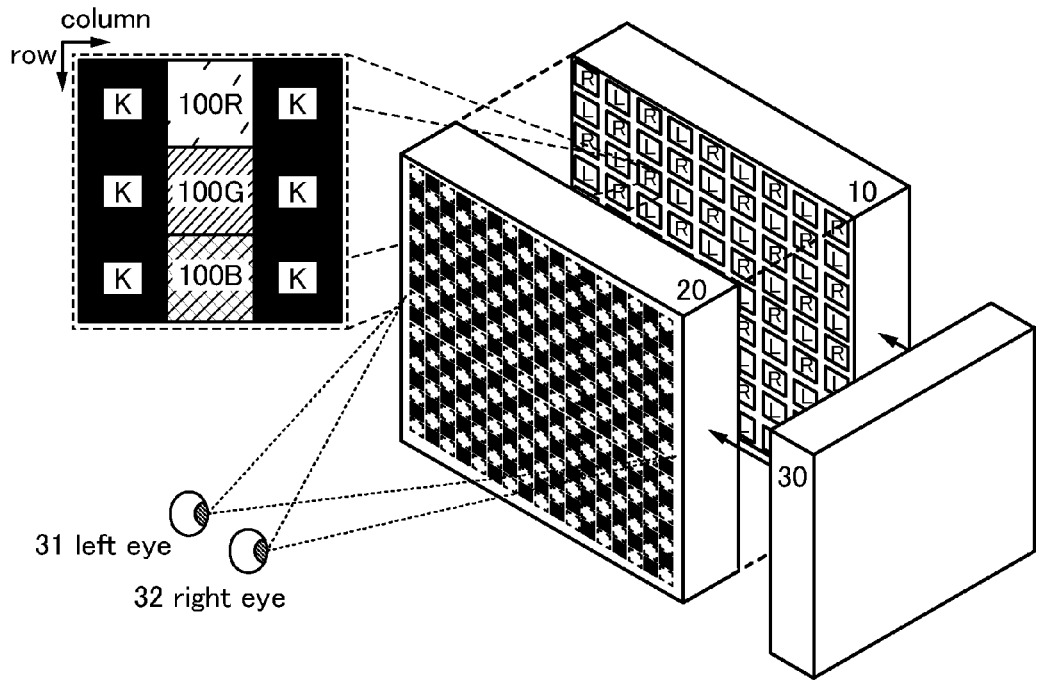
FIGS. 8A and 8B are diagrams illustrating examples of a display state of a display device.
Figure 8B:
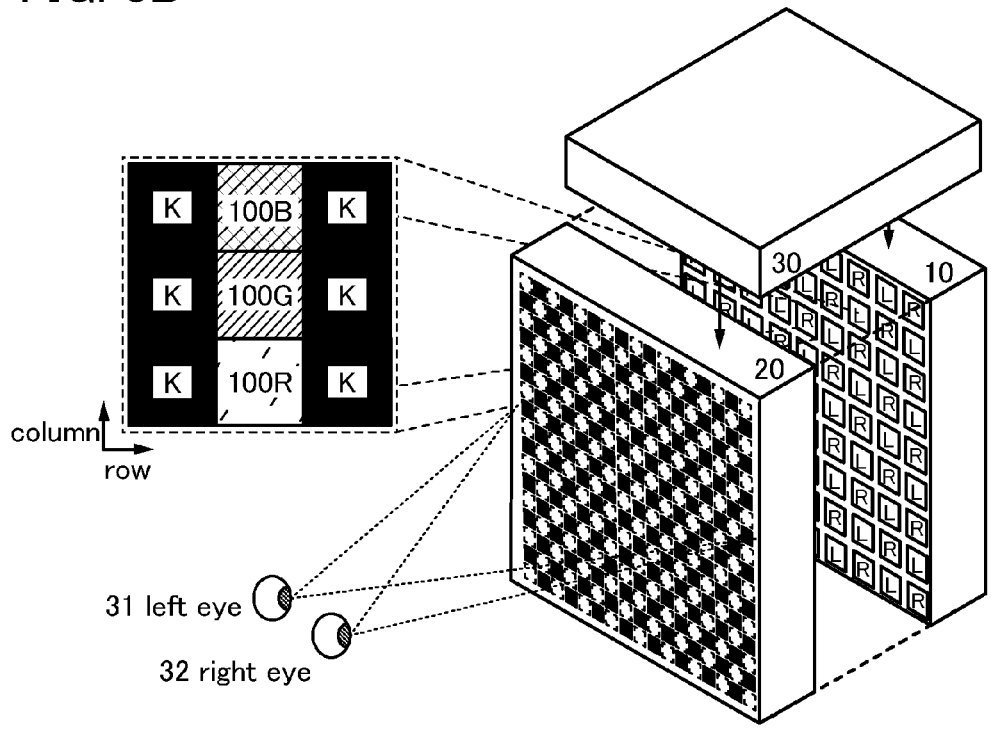

An example of a display state which is different from the display state illustrated in FIGS. 7A and 7B is described with reference to FIGS. 8A and 8B. Specifically, FIGS. 8A and 8B show a state in which a parallax barrier is arranged in a checkered pattern in the shutter panel 20. In FIGS. 8A and 8B, in accordance with the shape of the parallax barrier, each of the pixel performing display for the right eye (pixels denoted by R in FIGS. 8A and 8B) and the pixels performing display for the left eye (pixels denoted by L in FIGS. 8A and 8B) out of the plurality of pixels included in the display panel 10 is arranged in a checkered pattern. Except for that, the display state is similar to that in FIGS. 7A and 7B; therefore, the above description is employed here.

<Electronic Devices Including Display Device Disclosed in this Specification>

As a display device according to one embodiment of the present invention, a mobile phone, a portable game machine, a portable information terminal, an electronic book reader, a video camera, a digital still camera, and the like can be given. Hereinafter, specific examples of such electronic devices will be described with reference to FIGS. 9A and 9B.

Figure 9A:
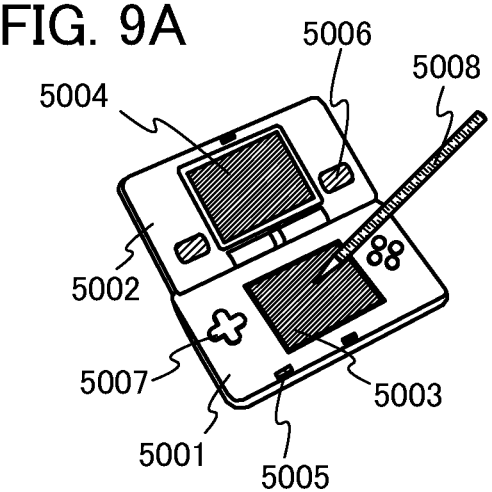
FIGS. 9A and 9B are diagrams illustrating examples of electronic devices.

FIG. 9A illustrates a portable game console including a housing 5001, a housing 5002, a display portion 5003, a display portion 5004, a microphone 5005, speakers 5006, operation keys 5007, and a stylus 5008. The display device according to one embodiment of the present invention can be used as the display portion 5003 or the display portion 5004. By using the display device according to one embodiment of the present invention as the display portion 5003 or the display portion 5004, it is possible to provide a highly convenient portable game console capable of displaying 3D images. Although the portable game console in FIG. 9A has the two display portions 5003 and 5004, the number of display portions included in a portable game console is not limited to this.

Figure 9B:
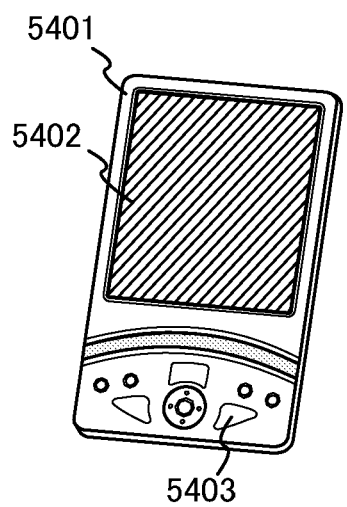

FIG. 9B illustrates a personal digital assistant including a housing 5401, a display portion 5402, and operation keys 5403. The display device according to one embodiment of the present invention can be used as the display portion 5402. By using the display device according to one embodiment of the present invention as the display portion 5402, it is possible to provide a highly convenient personal digital assistant capable of displaying 3D images.

This application is based on Japanese Patent Application serial no. 2011-067417 filed with Japan Patent Office on Mar. 25, 2011, the entire contents of which are hereby incorporated by reference.

What is claimed is:

1. A driving method of a display device, the display device comprising a display panel comprising a plurality of pixels arranged in matrix, each one of the plurality of pixels comprising A×B sub-pixels arranged in A rows and B columns wherein A and B are natural numbers of 3 or more, the driving method comprising:
   emitting light in A sub-pixels arranged in one specific column and not emitting light in A×(B−1) sub-pixels arranged in (B−1) columns other than the one specific column in a first display state; and
   emitting light in B sub-pixels arranged in one specific row and not emitting light in (A−1)×B sub-pixels arranged in (A−1) rows other than the one specific row in a second display state,
   wherein the display device further comprises a shutter panel comprising a plurality of optical shutters arranged in a matrix, the driving method further comprising the steps of:
   arranging a first parallax barrier by bringing a first part of the plurality of optical shutters into a light-shielding state and bringing a second part of the plurality of optical shutters into a light-transmitting state in the first display state; and
   arranging a second parallax barrier by bringing a third part of the plurality of optical shutters into a light-shielding state and bringing a fourth part of the plurality of optical shutters into a light-transmitting state in the second display state.

2. The driving method of a display device according to claim 1, wherein:
   the A sub-pixels each emit a different color of light from each other;
   the B sub-pixels each emit a different color of light from each other;
   a white light can be obtained when lights emitted from the A sub-pixels are mixed; and
   a white light can be obtained when lights emitted from the B sub-pixels are mixed.

3. The driving method of a display device according to claim 1, wherein:
   a first stripe-shaped parallax barrier is arranged in the first display state;
   the first stripe-shaped parallax barrier has a long axis in a direction in which the A sub-pixels arranged in the one specific column are aligned;
   a second stripe-shaped parallax barrier is arranged in the second display state; and
   the second stripe-shaped parallax barrier has a long axis in a direction in which the B sub-pixels arranged in the one specific row are aligned.

4. The driving method of a display device according to claim 1, wherein:
   the first parallax barrier is arranged in a first checkered pattern in the first display state; and
   the second parallax barrier is arranged in a second checkered pattern in the second display state.

5. The driving method of a display device according to claim 4, wherein the first checkered pattern is a same pattern as the second checkered pattern.

6. A driving method of a display device, the display device comprising a pixel comprising a first sub-pixel, a second sub-pixel arranged in a first direction with respect to the first sub-pixel, and a third sub-pixel arranged in a second direction with respect to the first sub-pixel, the second direction being a different direction from the first direction, the driving method comprising the steps of:

emitting light in the first sub-pixel and the second sub-pixel, and not emitting light in the third sub-pixel in a first display state; and emitting light in the first sub-pixel and the third sub-pixel, and not emitting light in the second sub-pixel in a second display state, wherein the display device further comprises a shutter panel comprising a plurality of optical shutters arranged in a matrix, the driving method further comprising the steps of:

arranging a first parallax barrier by bringing a first part of the plurality of optical shutters into a light-shielding state and bringing a second part of the plurality of optical shutters into a light-transmitting state in the first display state; and arranging a second parallax barrier by bringing a third part of the plurality of optical shutters into a light-shielding state and bringing a fourth part of the plurality of optical shutters into a light-transmitting state in the second display state.

7. The driving method of a display device according to claim 6, wherein:

the second sub-pixel emits a different color of light from the first sub-pixel; and the third sub-pixel emits a different color of light from the first sub-pixel.

8. The driving method of a display device according to claim 6, wherein:

a first stripe-shaped parallax barrier having a long axis in the first direction, is arranged in the first display state; and a second stripe-shaped parallax barrier including a long axis in the second direction, is arranged in the second display state.

9. The driving method of a display device according to claim 6, wherein:

the first parallax barrier is arranged in a first checkered pattern in the first display state; and the second parallax barrier is arranged in a second checkered pattern in the second display state.

10. The driving method of a display device according to claim 9, wherein the first checkered pattern is a same pattern as the second checkered pattern.

11. A display device comprising:

a display panel comprising a plurality of pixels arranged in a matrix, each one of the plurality of pixels comprising A×B sub-pixels arranged in A rows and B columns wherein A and B are natural numbers of 3 or more; and a shutter panel comprising a plurality of optical shutters arranged in a matrix, wherein:

A sub-pixels arranged in one specific column are configured to emit light in a first display state;

A×(B−1) sub-pixels arranged in (B−1) columns other than the one specific column are configured not to emit light in the first display state;

B sub-pixels arranged in one specific row are configured to emit light in a second display state;

(A−1)×B sub-pixels arranged in (A−1) rows other than the one specific row are configured not to emit light in the second display state;

each one of the A sub-pixels is configured to emit a different color of light with each other;

each one of the B sub-pixels is configured to emit a different color of light with each other;

a white light can be obtained when lights emitted from the A sub-pixels are mixed;

a white light can be obtained when lights emitted from the B sub-pixels are mixed;

the shutter panel is configured to arrange a first parallax barrier by bringing a first part of the plurality of optical shutters into a light-shielding state and bringing a second part of the plurality of optical shutters into a light-transmitting state in the first display state; and the shutter panel is configured to arrange a second parallax barrier by bringing a third part of the plurality of optical shutters into a light-shielding state and bringing a fourth part of the plurality of optical shutters into a light-transmitting state in the second display state.

12. The display device according to claim 11 further comprising a control portion configured to control a display using the plurality of pixels in the display panel and an arrangement of a parallax barrier using the plurality of optical shutters in the shutter panel.

13. The display device according to claim 11, wherein a shape of each one of the plurality of pixels is one of a square shape and a substantially square shape.

14. The display device according to claim 11, wherein each one of the A×B sub-pixels comprises an organic electroluminescence element.

15. The display device according to claim 14, wherein a shape of each one of the A×B sub-pixels comprises an element configured to supply current corresponding to an image signal to the organic electroluminescence element.

16. An electronic device comprising the display device according to claim 11.

\* \* \* \* \*